(12) United States Patent
Lee

(10) Patent No.: US 11,217,830 B2
(45) Date of Patent: Jan. 4, 2022

(54) BATTERY PACK

(71) Applicant: SAMSUNG SDI CO., LTD., Yongin-si (KR)

(72) Inventor: Sangjoo Lee, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 161 days.

(21) Appl. No.: 16/498,574

(22) PCT Filed: Mar. 14, 2018

(86) PCT No.: PCT/KR2018/002984
§ 371 (c)(1),
(2) Date: Sep. 27, 2019

(87) PCT Pub. No.: WO2018/186601
PCT Pub. Date: Oct. 11, 2018

(65) Prior Publication Data
US 2020/0099106 A1 Mar. 26, 2020

(30) Foreign Application Priority Data
Apr. 6, 2017 (KR) .................. 10-2017-0044972

(51) Int. Cl.
*H01M 10/42* (2006.01)
*H01M 50/531* (2021.01)
*H01M 50/543* (2021.01)
*H01M 50/172* (2021.01)

(52) U.S. Cl.
CPC ....... *H01M 10/425* (2013.01); *H01M 50/172* (2021.01); *H01M 50/531* (2021.01); *H01M 50/543* (2021.01); *H01M 2010/4271* (2013.01)

(58) Field of Classification Search
CPC .................................................. H01M 10/425
See application file for complete search history.

(56) References Cited

U.S. PATENT DOCUMENTS

| 8,895,178 B2 | 11/2014 | Byun et al. |
| 9,083,028 B2 | 7/2015 | Choi et al. |
| 9,231,235 B2 | 1/2016 | Lee et al. |
| 2012/0070702 A1 | 3/2012 | Byun et al. |
| 2013/0059171 A1 | 3/2013 | Kim et al. |
| 2013/0330575 A1* | 12/2013 | Baek .................. H01M 50/528 429/7 |
| 2016/0233479 A1* | 8/2016 | Ahn .................... H01M 50/531 |

(Continued)

FOREIGN PATENT DOCUMENTS

| KR | 10-2009-0011995 A | 2/2009 |
| KR | 10-0889624 B1 | 3/2009 |
| KR | 10-1227870 B1 | 1/2013 |

(Continued)

OTHER PUBLICATIONS

International Search Report and Written Opinion, dated Jun. 21, 2018, for PCT/KR2018/002984 filed Mar. 14, 2018.

*Primary Examiner* — Brian R Ohara
(74) *Attorney, Agent, or Firm* — Lee IP Law, P.C.

(57) ABSTRACT

The present disclosure provides a battery pack. The battery pack includes: a bare cell; a circuit module arranged in parallel to a terrace portion of the bare cell and connected to a tab of the bare cell; and a holder surrounding two surfaces of the circuit module and the terrace portion of the bare cell.

12 Claims, 14 Drawing Sheets

(56) References Cited

U.S. PATENT DOCUMENTS

2016/0276647 A1   9/2016   Lee et al.

FOREIGN PATENT DOCUMENTS

| KR | 10-2013-0065686 A | 6/2013 |
| KR | 10-2013-0088111 A | 8/2013 |
| KR | 10-2013-0065289 A | 9/2013 |
| KR | 10-2015-0134128 A | 12/2015 |

* cited by examiner

BATTERY PACK

CROSS-REFERENCE TO THE RELATED APPLICATION

This is the U.S. national phase application based on PCT Application No. PCT/KR2018/002984, filed Mar. 14, 2018, which is based on Korean Patent Application No. 10-2017-0044972, filed Apr. 6, 2017, the entire contents of all of which are hereby incorporated by reference.

TECHNICAL FIELD

The present disclosure relates to a battery pack.

BACKGROUND ART

In recent years, with the rapid development of electronics, communication, and computer industries, devices such as camcorders, cellular phones, laptop computers, and tablet PCs have been widely used, and thus there has been increasing demand for high-reliability, high-performance secondary batteries that have light weights and long service times. There has been much interest in lithium secondary batteries which satisfy such demand, and the application of lithium secondary batteries has widely expanded.

DESCRIPTION OF EMBODIMENTS

Technical Problem

Battery packs are used in the form of a hard pack in which components such a bare cell and a safety device are accommodated in an outer case to protect the components or in the form of an inner pack in which the gap between a bare cell and a protective circuit board is filled with a hot melt resin and the bare cell and the protective circuit board are tubed with a thin casing and are labeled.

Lithium secondary batteries may be classified according to the types of electrolytes. For example, lithium metal batteries and lithium ion batteries use organic solvent electrolytes, and lithium polymer batteries use solid polymer electrolytes. In addition, according to the types of cans accommodating electrode assemblies and electrolytes, lithium secondary batteries may be classified into a cylindrical type, a prismatic type, and a pouch type.

In general, polymer batteries using solid polymer electrolytes have a pouch-type outer shape, and lithium ion batteries using organic solvent electrolytes have a cylindrical or prismatic outer shape.

Solution to Problem

Embodiments of the present disclosure provide battery packs.

An aspect of the present disclosure may provide a battery pack including: a bare cell; a circuit module arranged in parallel to a terrace portion of the bare cell and connected to a tab of the bare cell; and a holder surrounding two surfaces of the circuit module and the terrace portion of the bare cell.

Advantageous Effects of Disclosure

According to embodiments of the present disclosure, the thickness of an insulator between a circuit module and a terrace portion is increased such that the circuit module and the terrace portion may be securely insulated from each other.

In addition, according to embodiments of the present disclosure, owing to the increased thickness of the insulator between the circuit module and the terrace portion, some of external impact force applied to the terrace portion may be absorbed.

According to embodiments of the present disclosure, a holder is used to firmly support the circuit module and surround two surfaces of the terrace portion and the circuit module, thereby improving insulation performance.

BEST MODE

An aspect of the present disclosure may provide a battery pack including: a bare cell; a circuit module arranged in parallel to a terrace portion of the bare cell and connected to a tab of the bare cell; and a holder surrounding two surfaces of the circuit module and the terrace portion of the bare cell.

In addition, the battery pack may further include an insulator between the circuit module and the terrace portion.

In addition, the insulator may be folded at least once.

In addition, a surface of the circuit module on which a circuit device is mounted may be in contact with the insulator.

In addition, the insulator may include: a first insulation portion arranged in parallel to the terrace portion; a second insulation portion connected to the first insulation portion at an angle from the first insulation portion; and a third insulation portion connected to the first insulation portion, folded from the first insulation portion, and placed in parallel to the first insulation portion.

In addition, a terminal of the bare cell may be bent at least once.

In addition, the holder may include: an insertion portion into which the circuit module is inserted; a first shield portion connected to the insertion portion and arranged along a front surface of the terrace portion; and a second shield portion connected to the first shield portion at an angle from the first shield portion and arranged in parallel to the terrace portion.

In addition, the circuit module may include an insertion protrusion inserted into the insertion portion.

In addition, the insertion portion may surround five surfaces of the circuit module.

In addition, at least one of the tab and a lead of the circuit module may be folded and arranged between the circuit module and the terrace portion.

MODE OF DISCLOSURE

The present disclosure will be more apparent from embodiments described in detail with reference to the accompanying drawings. However, the present disclosure is not limited to the embodiments disclosed below, but may be implemented in various forms. The embodiments are provided to fully convey the scope of the disclosure to those skilled in the art, and the scope of the present disclosure is defined only by the claims. In the following description, technical terms are used only for explaining embodiments, and not for purposes of limitation. The terms of a singular form may include plural forms unless specifically mentioned. The meaning of 'comprises' and/or 'comprising' specifies an element, a step, an operation, and/or a device but does not exclude other elements, steps, operations, and/or devices. It will be understood that although the terms "first," "second," etc. may be used herein to describe various elements, these elements should not be limited by these terms. These terms are only used to distinguish one element from another.

Figure 1:
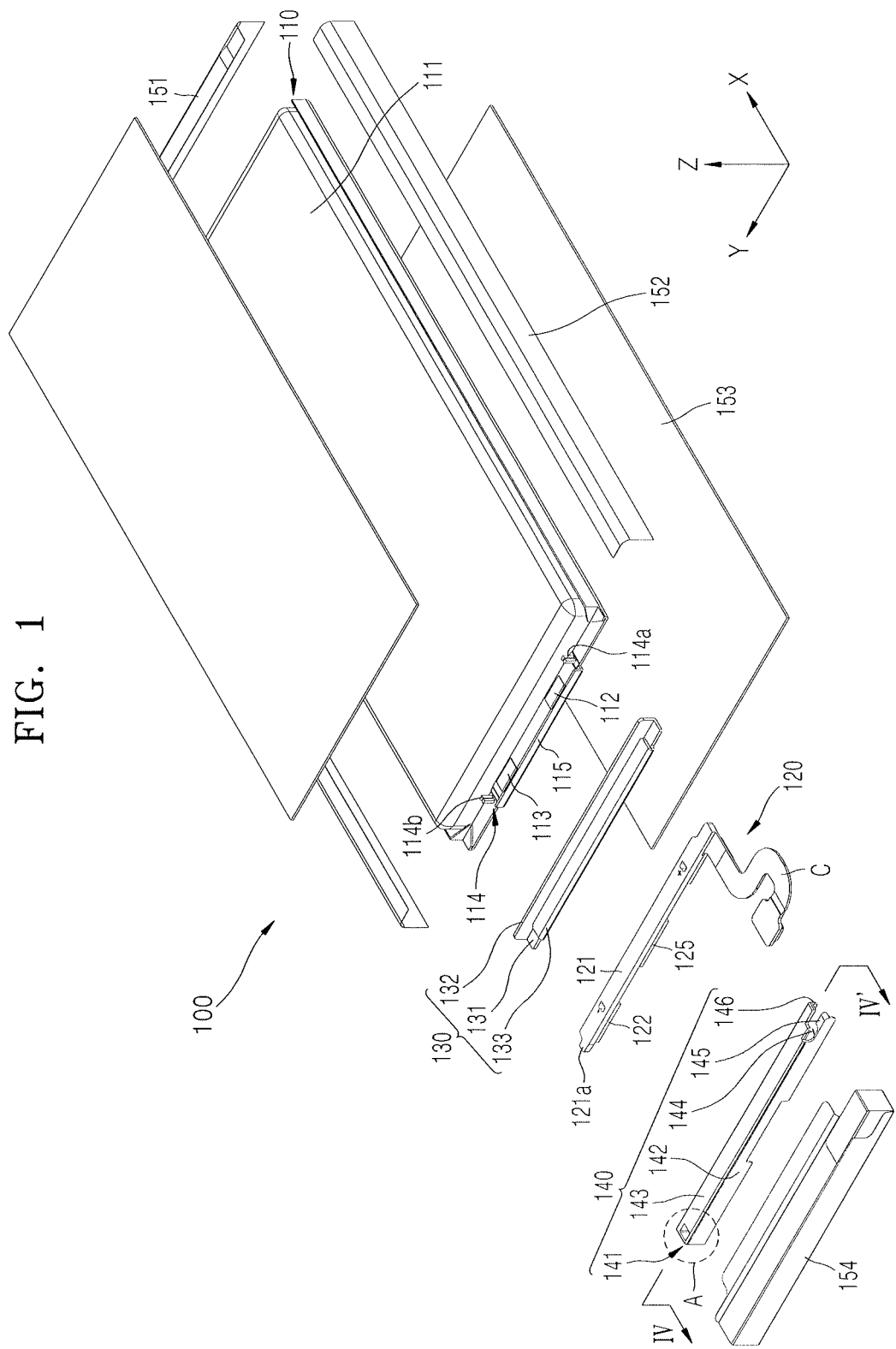
FIG. 1 is an exploded perspective view illustrating a battery pack according to an embodiment of the present disclosure.
Figure 2:
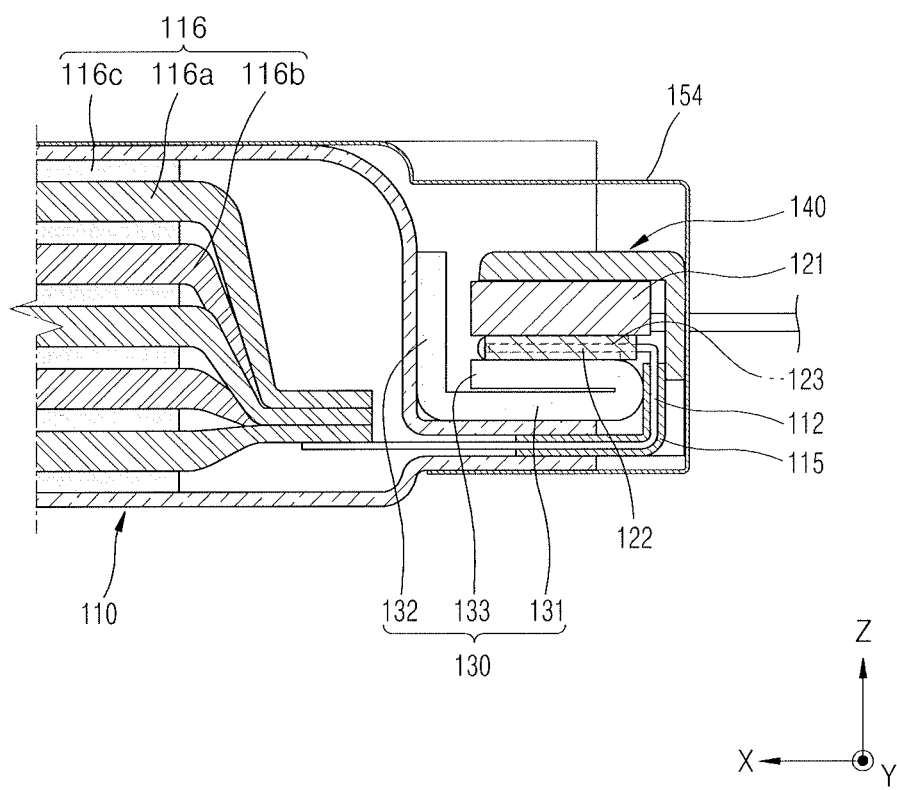
FIG. 2 is a cross-sectional view illustrating a portion of the battery pack shown in FIG. 1.
Figure 3:
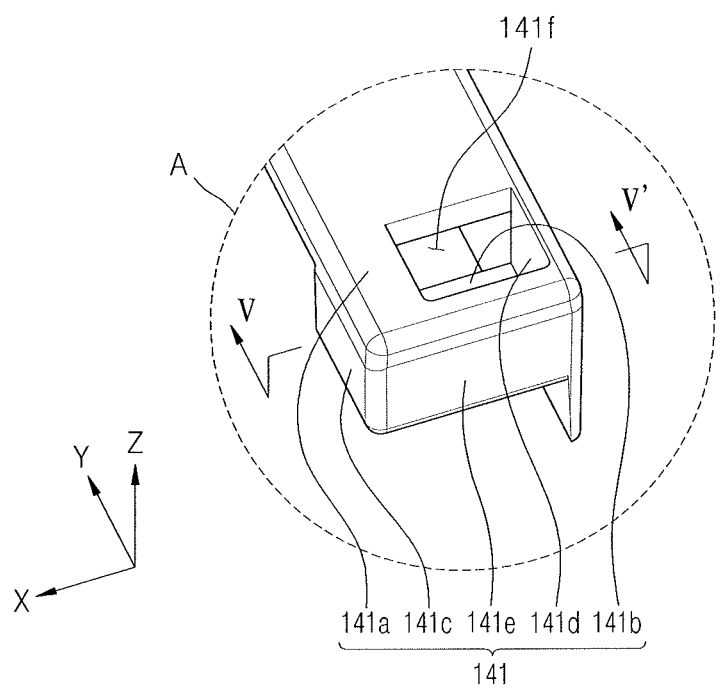
FIG. 3 is an enlarged perspective view illustrating a region A of FIG. 1.
Figure 4:
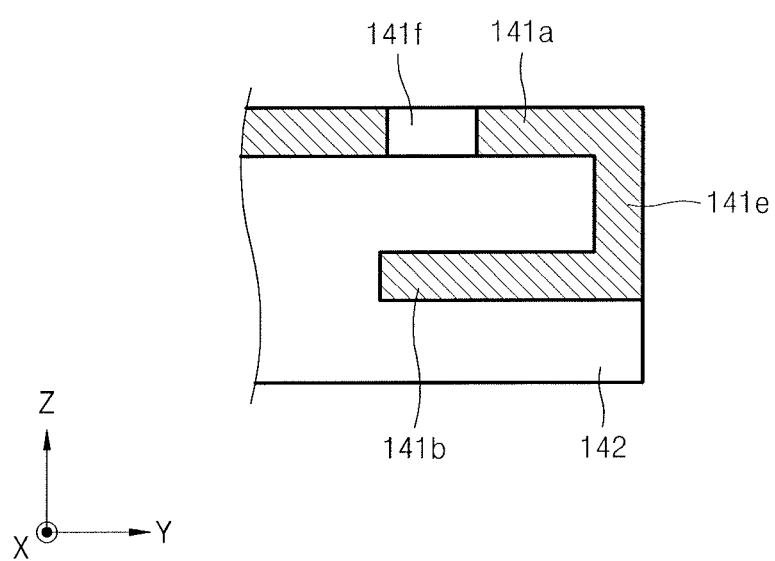
FIG. 4 is a cross-sectional view taken along line IV-IV' in FIG. 1.
Figure 5:
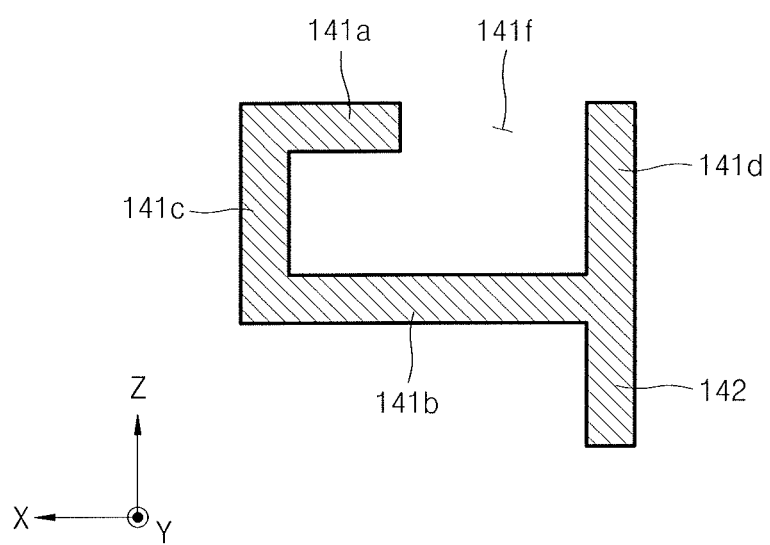
FIG. 5 is a cross-sectional view taken along line V-V' in FIG. 3.

FIG. 1 is an exploded perspective view illustrating a battery pack 100 according to an embodiment of the present disclosure. FIG. 2 is a cross-sectional view illustrating a portion of the battery pack 100 shown in FIG. 1. FIG. 3 is an enlarged perspective view illustrating a region A of FIG. 1. FIG. 4 is a cross-sectional view taken along line IV-IV' in FIG. 1. FIG. 5 is a cross-sectional view taken along line V-V' in FIG. 3.

Referring to FIGS. 1 to 5, the battery pack 100 may include a bare cell 110, a circuit module 120, an insulator 130, a holder 140, and a protective member (not shown).

The bare cell 110 is a pouch-type cell which includes a pouch-type casing 111 and positive and negative electrode tabs 112 and 113 extending from the casing 111. The bare cell 110 may be, for example, a lithium-ion polymer battery. An upper portion of the bare cell 110 may include a terrace portion 114, and both sides of the bare cell 110 may be bent.

The bare cell 110 includes the casing 111, an electrode assembly 116 accommodated inside the casing 111, and an electrolyte (not shown). The electrode assembly 116 includes a positive electrode plate 116a coated with a positive electrode slurry to which a positive electrode active material is added, a negative electrode plate 116b coated with a negative electrode slurry to which a negative electrode active material is added, and a separator 116c between the positive electrode plate 116a and the negative electrode plate 116b.

The positive electrode plate 116a may include: a positive electrode coated portion formed by coating a positive electrode collector formed of a material such as aluminum with the positive electrode slurry; and a positive electrode non-coated portion which is a portion of the positive electrode collector not coated with the positive electrode slurry. The positive electrode active material is included in the positive electrode slurry. For example, the positive electrode active material may be a lithium-containing transition metal oxide such as $LiCoO_2$, $LiNiO_2$, $LiMnO_2$, or $LiMnO_4$, or a lithium chalcogenide. In an embodiment, the positive electrode tab 112 is joined to the positive electrode non-coated portion, and a portion of the positive electrode tab 112 extends outward from the casing 111.

The negative electrode plate 116b may include: a negative electrode coated portion formed by coating a negative electrode collector formed of a material such as nickel with the negative electrode slurry; and a negative electrode non-coated portion which is a portion of the negative electrode collector not coated with the negative electrode slurry. The negative electrode active material is included in the negative electrode slurry. Examples of the negative electrode active material may include: a carbon material such as crystalline carbon, amorphous carbon, a carbon composite, or carbon fiber; a lithium metal; and a lithium alloy. In an embodiment, the negative electrode tab 113 is joined to the negative electrode non-coated portion, and a portion of the negative electrode tab 113 extends outward from the casing 111.

The separator 116c may include a porous polypropylene (PP) or porous polyethylene (PE) material such that lithium ions may easily move between the positive electrode plate 116a and the negative electrode plate 116b.

The pouch-type casing 111 may be metal foil (not shown) and may include an insulative layer (not shown) on each of upper and lower surfaces of the metal foil. For example, the metal foil may include a material such as aluminum or stainless steel.

A lower surface of the terrace portion 114 is formed substantially in one piece with a lower surface of the casing 111, and an upper surface of the terrace portion 114 is lower than an upper surface of the casing 111.

Insertion protrusions 114a and 114b may be arranged on the terrace portion 114 and may be inserted into the circuit module 120 when the circuit module 120 is placed on the terrace portion 114.

Each of the positive and negative electrode tabs 112 and 113 may be wrapped with adhesive tap tape 115 to improve sealing between the casing 111 and the positive and negative electrode tabs 112 and 113 and electrically insulate the positive and negative electrode tabs 112 and 113 from the casing 111.

The circuit module 120 may be placed on the terrace portion 114. In this case, the circuit module 120 may be electrically connected to the bare cell 110 to prevent overheating and explosions caused by overcharging, overdischarging, or an overcurrent of the bare cell 110.

The circuit module 120 may include a circuit board 121, a circuit device 122 mounted on an upper surface of the circuit board 121, a positive lead tab 123, a negative lead tab (not shown), and a safety device 125. The circuit board 121 include an insertion protrusion 121a inserted into the insertion portion 141. A width of the insertion protrusion 121a is different from a width of the other portion of the circuit board except the insertion protrusion. For example, the width of the insertion protrusion 121a is smaller than the width of the other portion of the circuit board except the insertion protrusion. The circuit device 122, the positive and negative lead tabs, and the safety device 125 may all be arranged on the upper surface of the circuit board 121.

The positive lead tab 123 and the negative lead tab are arranged on the upper surface of the circuit board 121 for electrical connection with the bare cell 110. The positive lead tab 123 is electrically connected to the positive electrode tab 112 of the bare cell 110 by welding, and the negative lead tab is electrically connected to the negative electrode tab 113 of the bare cell 110 by welding. In addition, holes may be formed in the circuit board 121 to receive the insertion protrusions 114a and 114b.

The circuit board 121 includes: a charge-discharge circuit pattern (not shown) for uniformly maintaining the state of charge of the bare cell 110 by controlling charge and discharge operations of the bare cell 110; or a protective circuit pattern (not shown) for preventing overdischarge and overcharge. The circuit device 122 may be provided on the circuit board 121 to form the charge-discharge circuit pattern and the protective circuit pattern.

The safety device 125 interrupts current when the temperature of the bare cell 110 is equal to or greater than an allowable temperature, thereby preventing an abnormal phenomenon caused by heating of the bare cell 110. The safety device 125 may be a positive thermal coefficient (PTC) device or a thermal cut-off device (TCO).

The insulator 130 may be arranged on the upper surface of the terrace portion 114 and may be in contact with an upper surface of the circuit module 120. In this case, the insulator 130 may shield the terrace portion 114, the positive electrode tab 112, the negative electrode tab 113, the positive lead tab 123, and the negative lead tab. In addition, the insulator 130 may shield the circuit device 122 arranged on the upper surface of the circuit module 120.

At least a portion of the insulator 130 may be bent at least once. For example, the insulator 130 may include a first insulation portion 131, a second insulation portion 132, and a third insulation portion 133. In this case, some of the first to third insulation portions 131 to 133 may be connected to each other while being bent from each other by a given angle, and some of the first to third insulation portions 131 to 133 may be arranged in a stacked manner. The first insulation portion 131 may be arranged in parallel to the upper surface of the terrace portion 114 and may be attached to the upper surface of the terrace portion 114. The second insulation portion 132 may be at an angle from the first insulation portion 131 and may be attached to a side of the terrace portion 114 (for example, a front surface of the casing 111). The third insulation portion 133 may be connected to the first insulation portion 131 in parallel with the first insulation portion 131. In this case, the third insulation portion 133 may be bent from the first insulation portion 131 and may be placed on the first insulation portion 131. In addition, the third insulation portion 133 may be coupled to the circuit device 122, the positive electrode tab 112, the negative electrode tab 113, the positive lead tab 123, and the negative lead tab. The third insulation portion 133 may be attached to the upper surface of the circuit board 121. In this case, the first insulation portion 131 and the third insulation portion 133 may be placed on each other to effectively insulate the circuit module 120 from the bare cell 110. That is, since the thickness of the insulator 130 between the circuit module 120 and the bare cell 110 increases, insulation between the circuit module 120 and the bare cell 110 may be improved.

The holder 140 may be installed on the terrace portion 114. In this case, the holder 140 may include an insertion portion 141, a first shield portion 142, and a second shield portion 143.

The insertion portion 141 may be located on an end of the holder 140 which corresponds to an end portion of the circuit board 121. For example, the insertion portion 141 may be at a position of the holder 140 that is opposite a flexible circuit board unit C of the circuit module 120. In this case, the insertion portion 141 may have a recessed shape such that the end portion of the circuit board 121 may be inserted into the insertion portion 141. In detail, the insertion portion 141 may cover five surfaces of the end portion of the circuit board 121. For example, the insertion portion 141 may shield a lower surface of the end portion of the circuit board 121. In this case, a hole 141f may be formed in a portion of the inserting portion 141 that faces the lower surface of the end portion of the circuit board 121. In addition, the insertion portion 141 may shield an end surface of the end portion of the circuit board 121 (for example, the left end surface of the circuit board 121 in FIG. 1). The insertion portion 141 may shield both lateral surfaces of the end portion of the circuit board 121. The insertion portion 141 may shield an upper surface of the end portion of the circuit board 121. In this case, the insertion portion 141 may form a space, and the end portion of the circuit board 121 may be fixedly inserted into the space. In particular, the distance between portions of the inserting portion 141 which are arranged on the upper and lower surfaces of the circuit board 121 is slightly less than the thickness of the circuit board 121 such that the circuit board 121 may be press fitted into the inserting portion 141. In this case, the end portion of the circuit board 121 inserted into the insertion portion 141 may be smaller than the other portion of the circuit board 121. For example, the width of the end portion of the circuit board 121 inserted into the insertion portion 141 may be less than the width of the other portion of the circuit board 121.

The insertion portion 141 may include: a first barrier wall 141a which shields the lower surface of the end portion of the circuit board 121; a second barrier wall 141b which faces the first barrier wall 141a and shields the upper surface of the circuit board 121; a third barrier wall 141c and a fourth barrier wall 141d which face both lateral surfaces of the circuit board 121 and connect the first barrier wall 141a and the second barrier wall 141b to each other; and a fifth barrier wall 141e which is connected to the first to fourth barrier walls 141a to 141d and shields the end surface of the end portion of the circuit board 121. In this case, the first barrier wall 141a may be formed in one piece with the second shield portion 143, and the fourth barrier wall 141d may be formed in one piece with the first shield portion 142. In addition, the first barrier wall 141a and the second barrier wall 141b are spaced apart from each other, and the third barrier wall 141c and the fourth barrier wall 141d are spaced apart from each other, such that a space may be formed inside the insertion portion 141 to receive the circuit board 121. In this case, the upper surface of the circuit board 121 may be defined as a surface on which the circuit device 122 is mounted, and the lower surface of the circuit board 121 may be defined as being opposite the upper surface of the circuit board 121. In addition, the lateral surfaces of the circuit board 121 may be defined as surfaces respectively facing the third and fourth barrier walls 141c and 141d. The end surface of the end portion of the circuit board 121 may be defined as a surface facing the fifth barrier wall 141e.

The first shield portion 142 may be connected to the insertion portion 141. In this case, the first shield portion 142 may be adjacent to a front surface of the terrace portion 114 and a lateral surface of the circuit board 121.

The second shield portion 143 may form an angle with the first shield portion 142. In this case, the first shield portion 142 and the second shield portion 143 may be connected to each other. The second shield portion 143 may be parallel to the upper surface of the terrace portion 114. That is, the second shield portion 143 may be in contact with the lower surface of the circuit board 121.

The first shield portion 142 and the second shield portion 143 may form a right angle. In this case, the first shield portion 142, the second shield portion 143, and the insertion portion 141 may be formed in one piece. In addition, the first shield portion 142 and the second shield portion 143 may have a plate shape and may completely shield the upper surface of the terrace portion 114.

In addition, the holder 140 may include a lead-out hole 144 such that the flexible circuit board unit C (cable) connected to the circuit module 120 for connection with an external electronic device or the like may be inserted into the lead-out hole 144 and led out through the lead-out hole 144. In addition, the holder 140 may include a board support portion 145 on which the other end portion of the circuit board 121 is placed and supported. In this case, the board support portion 145 may be parallel to the upper or lower surface of the circuit board 121. In particular, the board support portion 145 may protrude from the first shield portion 142. The holder 140 may include a hooking portion 146 which faces the board support portion 145. The hooking portion 146 may be arranged in parallel to the first shield portion 142 and may extend from the second shield portion.

The other end portion of the circuit board 121 (for example, a portion of the circuit board 121 to which the flexible circuit board unit C is connected) may be inserted between the board support portion 145 and the hooking portion 146.

The protective member may include a first protective member 151, a second protective member 152, a third protective member 153, and a fourth protective member 154. The first protective member 151 may be arranged on a portion of a rear surface of the bare cell 110. In addition, the second protective member 152 may surround a portion of a lateral surface of the bare cell 110. In this case, two second protective members 152 may be provided respectively on lateral surfaces of the bare cell 110. The third protective member 153 may be arranged on upper and lower surfaces of the bare cell 110. The fourth protective member 154 may be arranged on a front surface of the bare cell 110 to surround the holder 140 and the terrace portion 114. In this case, a hole may be formed in the fourth protective member 154 to allow the flexible circuit board unit C to pass therethrough.

In the following description, a method of manufacturing the battery pack 100 will be described in detail.

Figure 6:
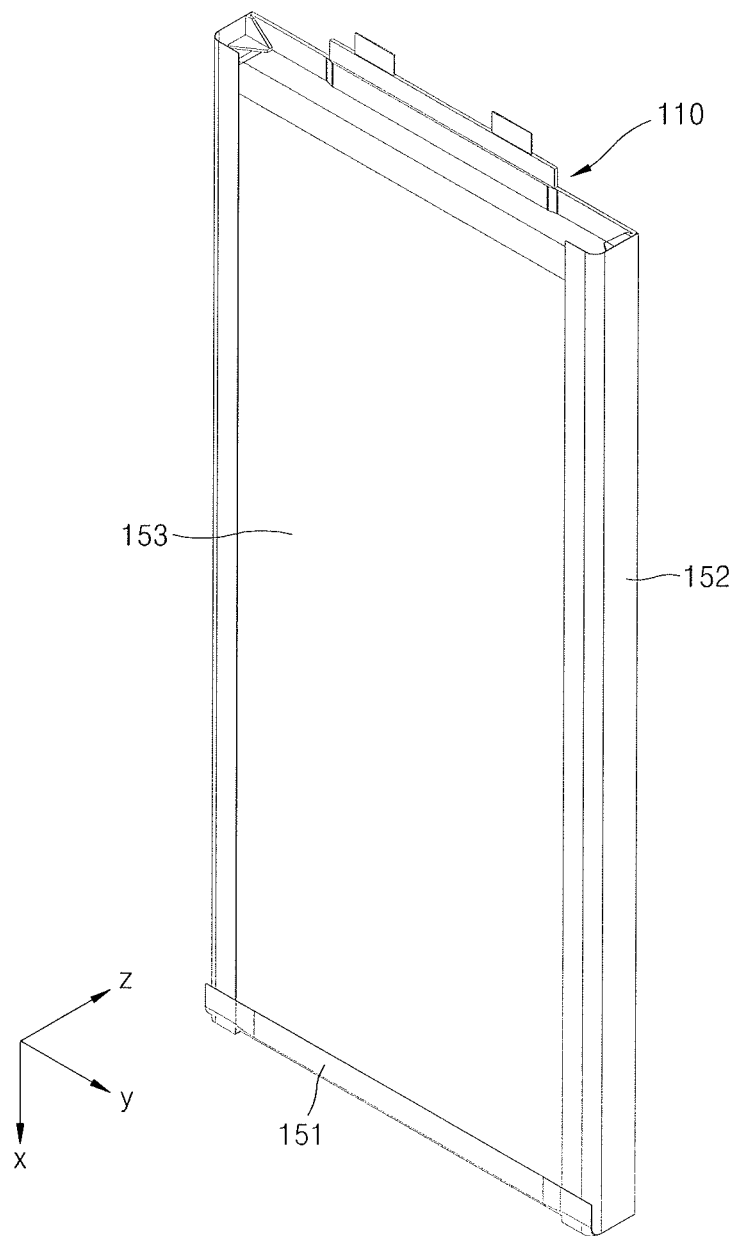
FIG. 6 is a perspective view illustrating a manufacturing sequence of the battery pack shown in FIG. 1.

FIG. 6 is a perspective view illustrating a manufacturing sequence of the battery pack 100 shown in FIG. 1.

Referring to FIG. 6, the bare cell 110 and the circuit module 120 may be prepared, and the first to third protective members 151 to 153 may be respectively attached to the lateral, upper, lower, and side surfaces of the bare cell 110. In this case, the second protective members 152 may be arranged to surround lateral surfaces of the terrace portion 114 of the bare cell 110.

Figure 7:
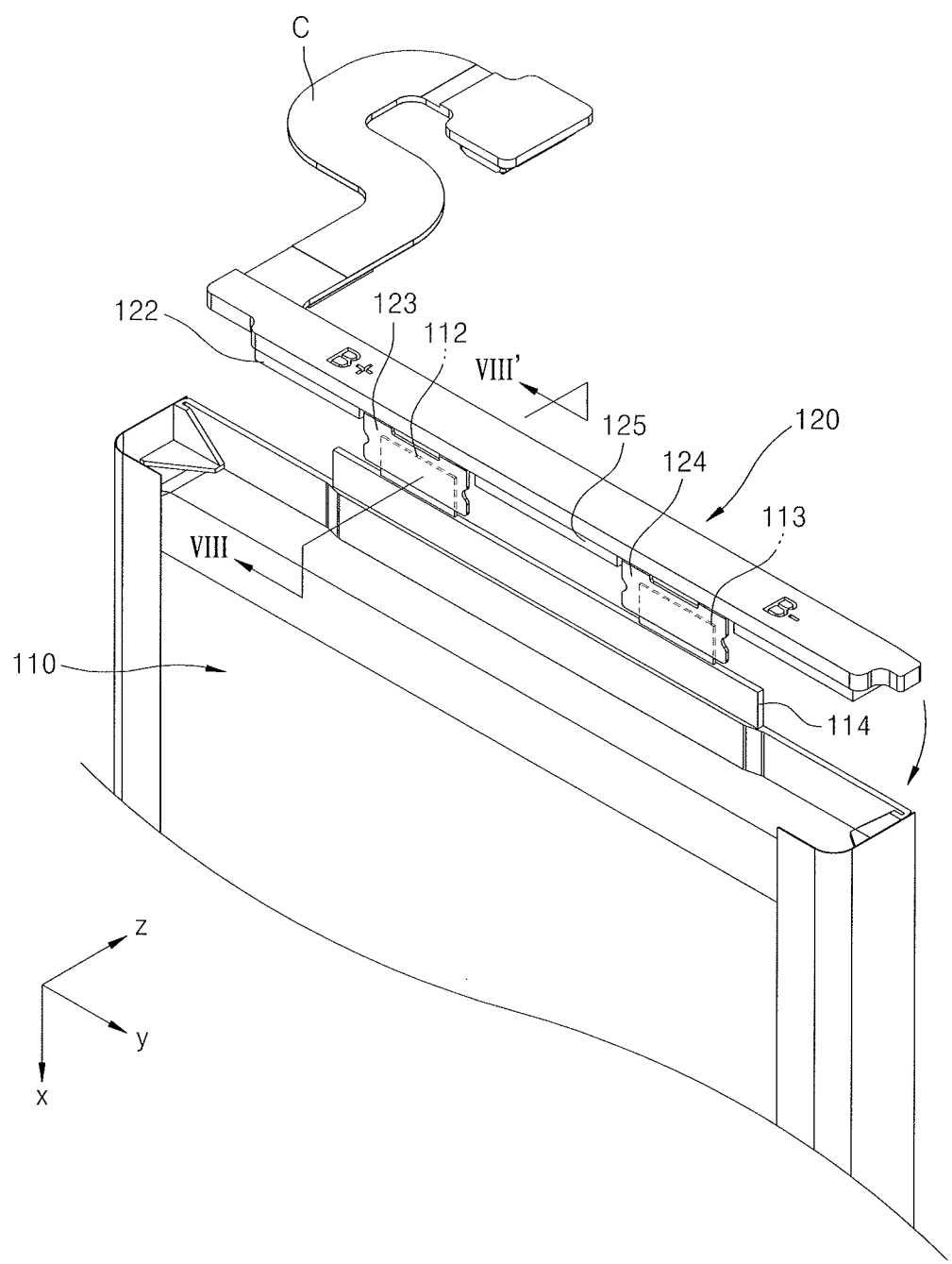
FIG. 7 is a perspective view illustrating a manufacturing sequence of the battery pack shown in FIG. 1.
Figure 8:
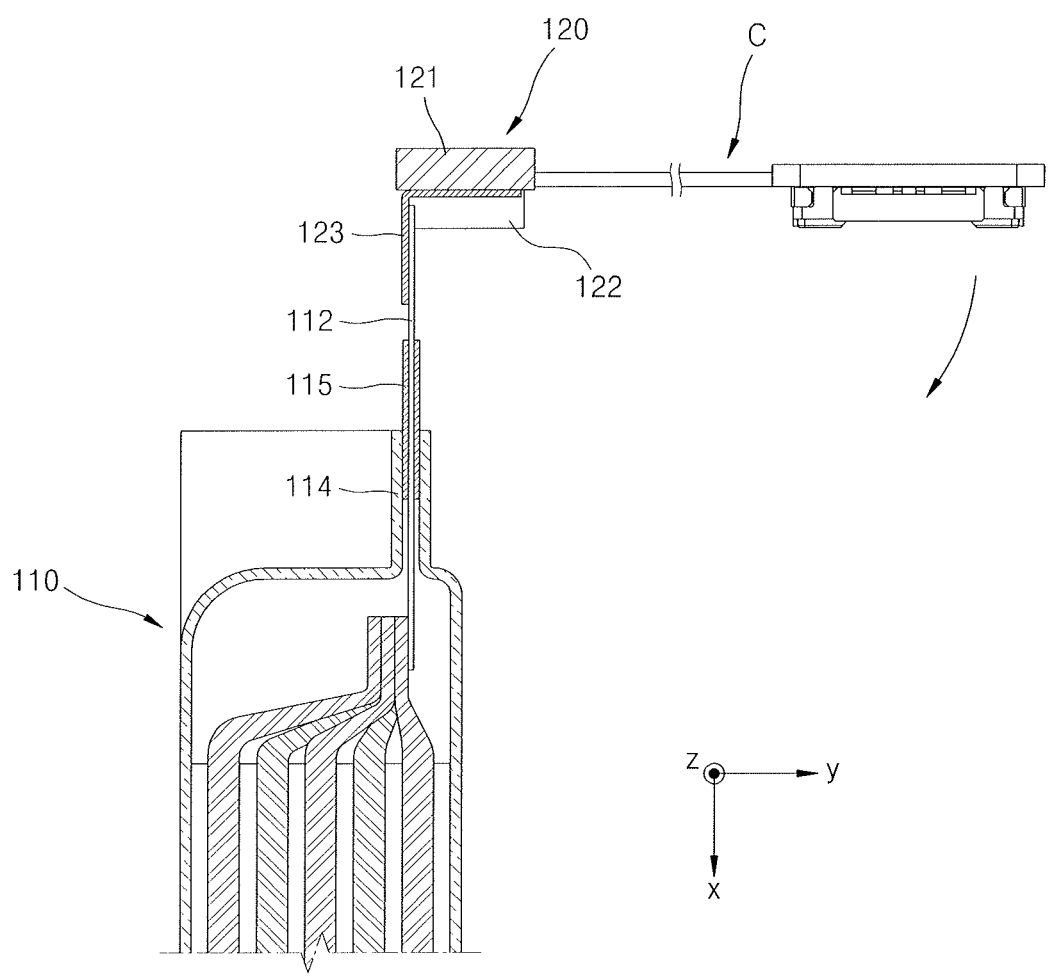
FIG. 8 is a cross-sectional view taken along line VIII-VIII' in FIG. 7.

FIG. 7 is a perspective view illustrating a manufacturing sequence of the battery pack 100 shown in FIG. 1. FIG. 8 is a cross-sectional view taken along line VIII-VIII' in FIG. 7.

Referring to FIGS. 7 and 8, after attaching the first to third protective members 151 to 153 to the bare cell 110, the positive lead tab 123 and the negative lead tab 124 may be respectively welded to the positive electrode tab 112 and the negative electrode tab 113. At this time, at least one of the tab 111 and 112 of the bare cell 110 and the lead tab 123 and 124 of the circuit module 120 is folded at least once and arranged between the circuit module and the terrace portion. For example, at least one of the positive electrode tab 112 and the positive lead tab 123 may include a portion which is bent at least once in a length direction (for example, an X direction in FIG. 7) of the bare cell 110. In addition, at least one of the negative electrode tab 113 and the negative lead tab 124 may include a portion which is bent at least once in the length direction of the bare cell 110. For ease of description, the following description will be given in detail, mainly for the case in which the positive lead tab 123 and the negative lead tab 124 are bent and connected to the positive electrode tab 112 and the negative electrode tab 113.

When the circuit module 120 is connected to the positive electrode tab 112 and the negative electrode tab 113 in a state in which the positive lead tab 123 and the negative lead tab 124 are bent as described above, the circuit board 121 and the terrace portion 114 may be at an angle from each other. Specifically, the circuit board 121 and the terrace portion 114 may be at a right angle from each other.

After the welding is completed as described above, the circuit module 120 may be fully rotated to the lower surface of the bare cell 110. In this case, a portion of the positive lead tab 123 may be folded (or placed) on the other portion of the positive lead tab 123 or a portion of the positive electrode tab 112. In this case, a portion of the negative lead tab 124 may be folded (or placed) on the other portion of the negative lead tab 124 or a portion of the negative electrode tab 113.

Figure 9:
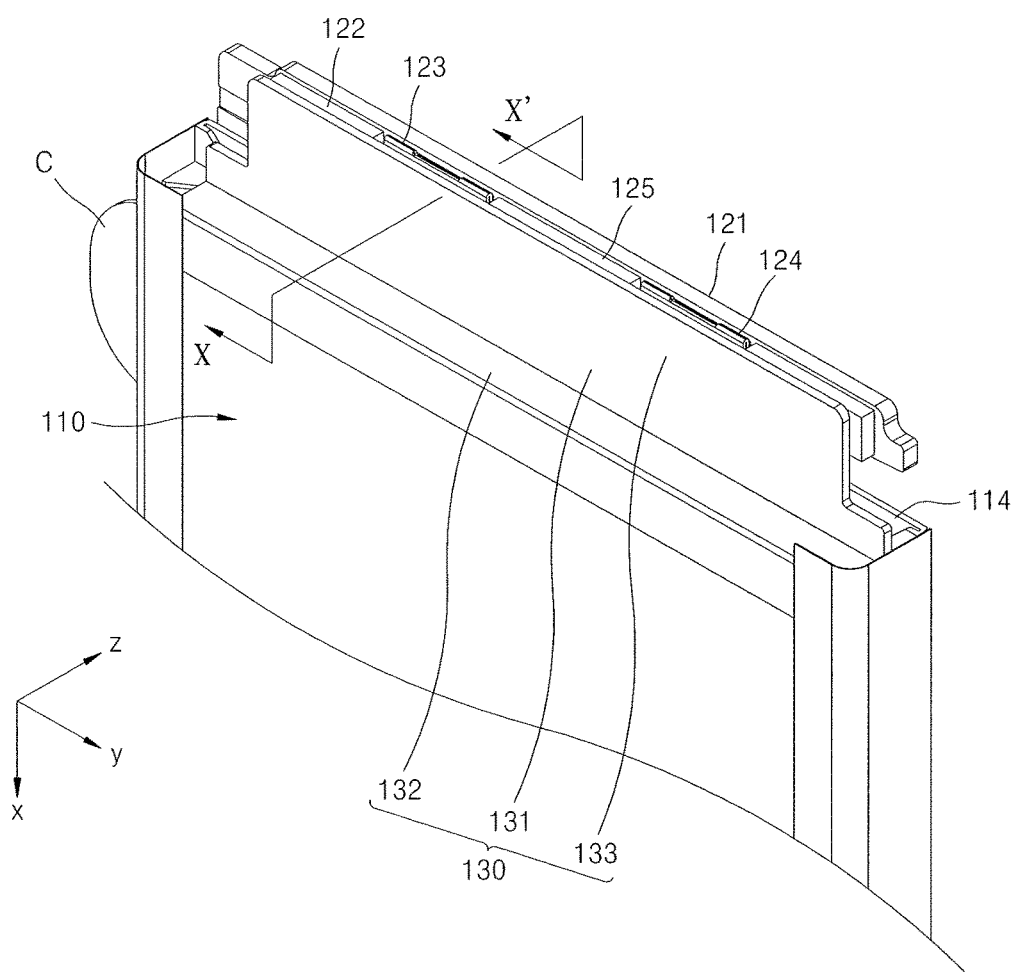
FIG. 9 is a perspective view illustrating a manufacturing sequence of the battery pack shown in FIG. 1.
Figure 10:
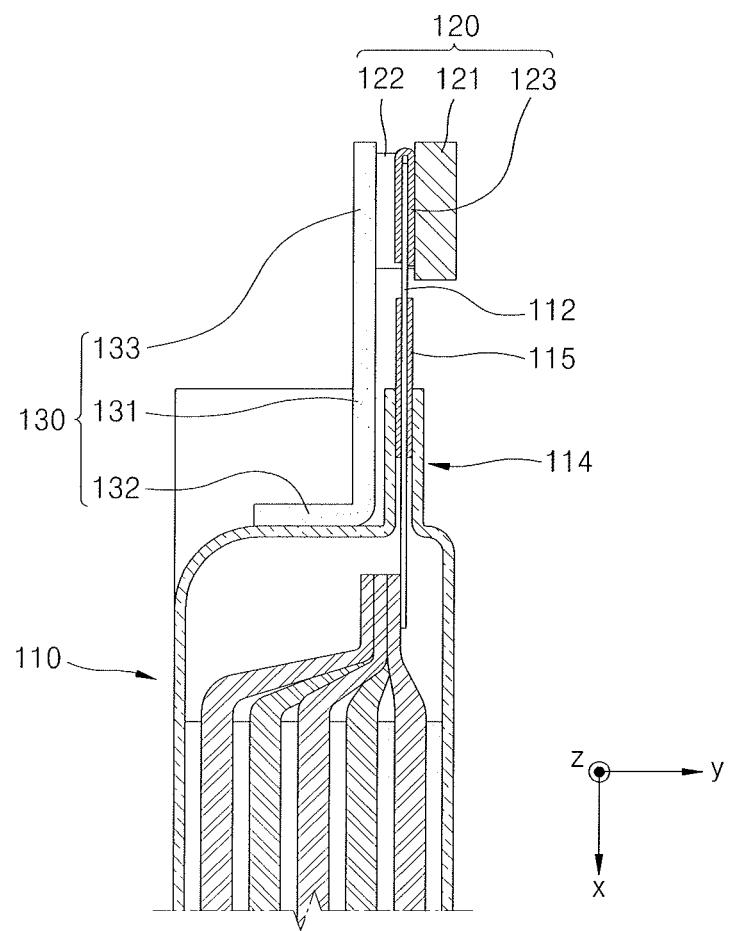
FIG. 10 is a cross-sectional view taken along line X-X' in FIG. 9.

FIG. 9 is a perspective view illustrating a manufacturing sequence of the battery pack 100 shown in FIG. 1. FIG. 10 is a cross-sectional view taken along line X-X' in FIG. 9.

Referring to FIGS. 9 and 10, the insulator 130 may be arranged on the terrace portion 114 and fixed to the terrace portion 114. In this case, the first insulation portion 131 may be arranged on the upper surface of the terrace portion 114, and the second insulation portion 132 may be arranged on a lateral surface of the terrace portion 114. In addition, the third insulation portion 133 may be arranged on the same plane as the first insulation portion 131 and may shield the upper surface of the circuit module 120 (for example, a surface of the circuit board 121 on which the circuit device 122 is mounted), the positive electrode tab 112, the negative electrode tab (not shown), the folded positive lead tab 123, and the folded negative lead tab 124.

Figure 11:
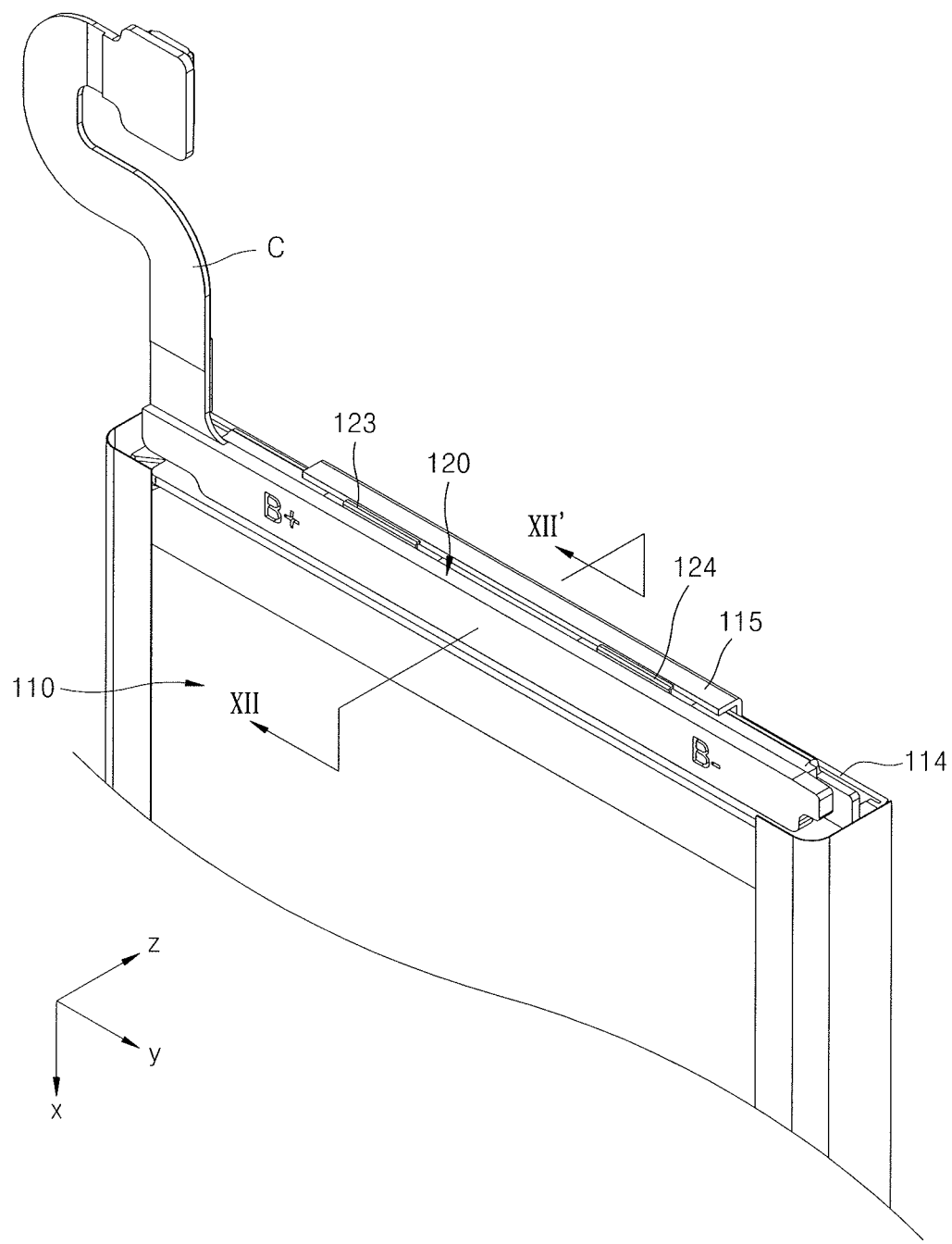
FIG. 11 is a perspective view illustrating a manufacturing sequence of the battery pack shown in FIG. 1.
Figure 12:
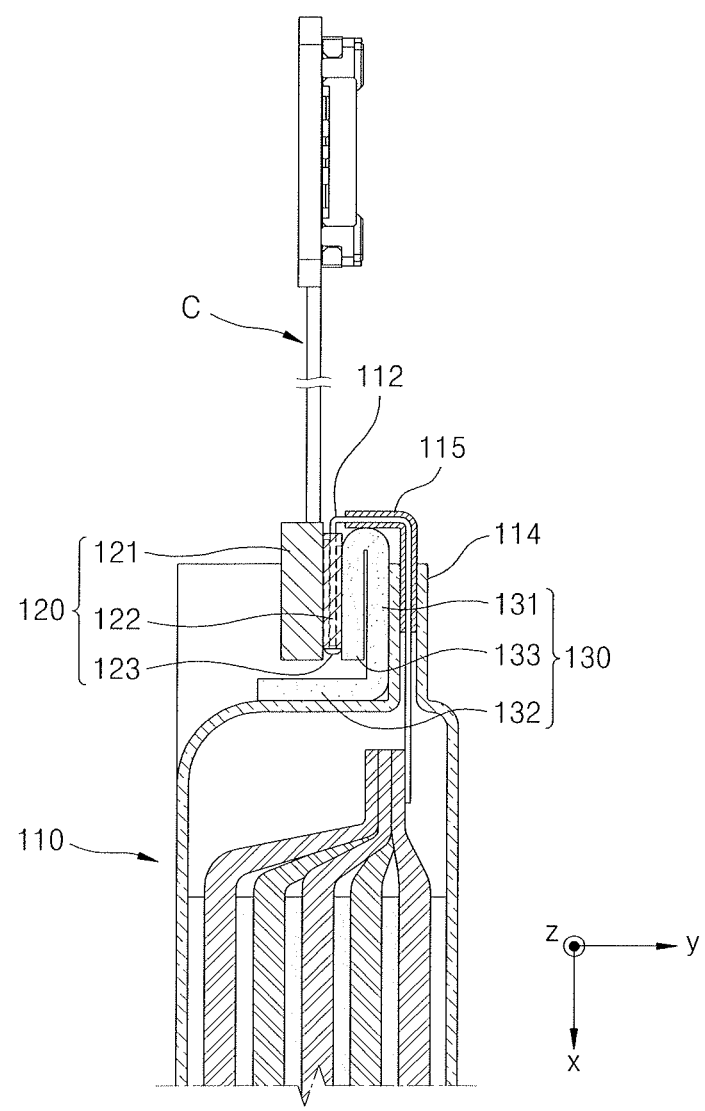
FIG. 12 is a cross-sectional view taken along line XII-XII' in FIG. 11.

FIG. 11 is a perspective view illustrating a manufacturing sequence of the battery pack shown in FIG. 1. FIG. 12 is a cross-sectional view taken along line XII-XII' in FIG. 11.

Referring to FIGS. 11 and 12, after the insulator 130 is arranged, the circuit module 120 may be rotated in the opposite direction to the direction in which the circuit module 120 is rotated in FIG. 7. That is, the circuit module 120 may be rotated toward the terrace portion 114.

In this case, the first insulation portion 131 and the third insulation portion 133 may be folded onto each other. Specifically, the upper surface of the terrace portion 114 may be at the lowermost side, and the first insulation portion 131 may be arranged on the upper surface of the terrace portion 114. In addition, the third insulation portion 133 may be arranged on the first insulation portion 131. In this case, the first insulation portion 131 and the third insulation portion 133 may be stacked in a state in which the first insulation portion 131 and the third insulation portion 133 are connected to each other. The positive lead tab 123, the negative lead tab 124, the positive electrode tab 112, the negative electrode tab (not shown), and the circuit device 122 may be placed on the third insulation portion 133. In addition, the circuit board 121 may be placed on the circuit device 122, and the lower surface of the circuit board 121 may be exposed to the outside.

In this case, particularly, the circuit module 120 may be completely inserted into the terrace portion 114.

Figure 13:
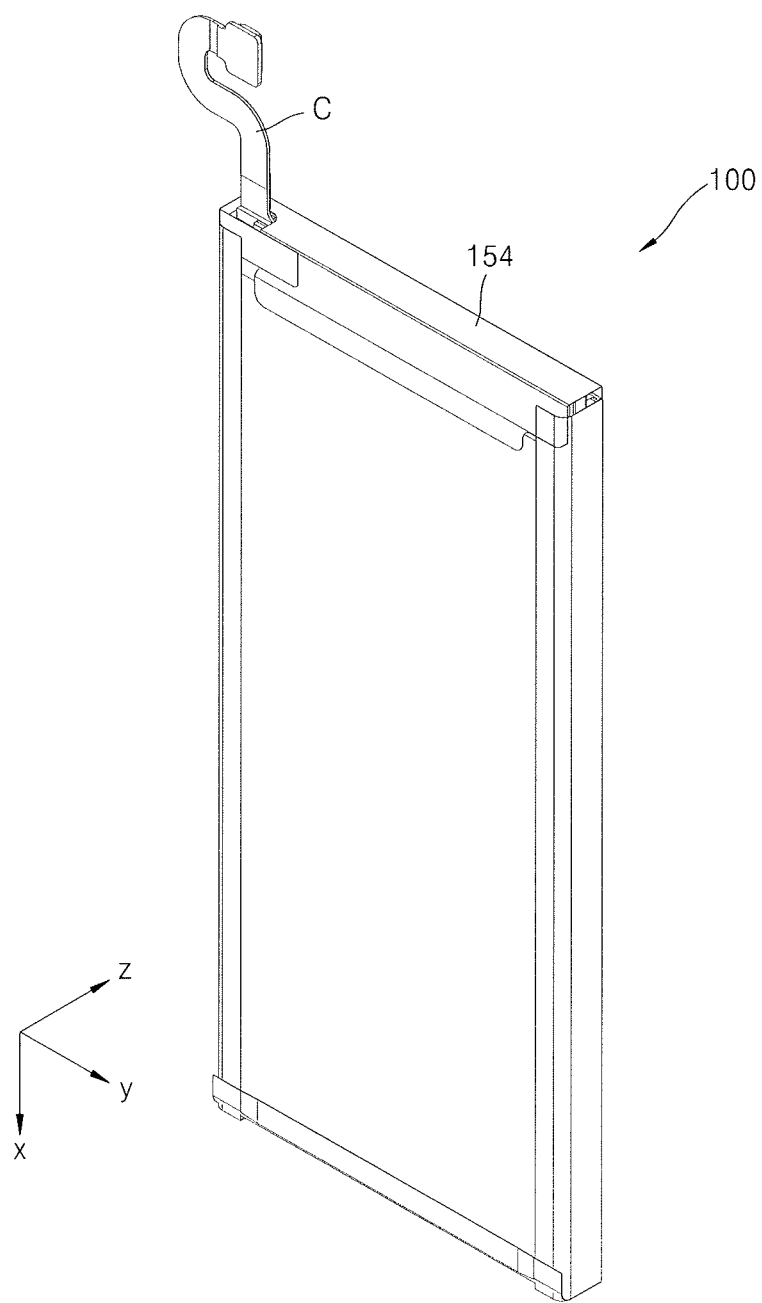
FIG. 13 is a perspective view illustrating a manufacturing sequence of the battery pack shown in FIG. 1.
Figure 14:
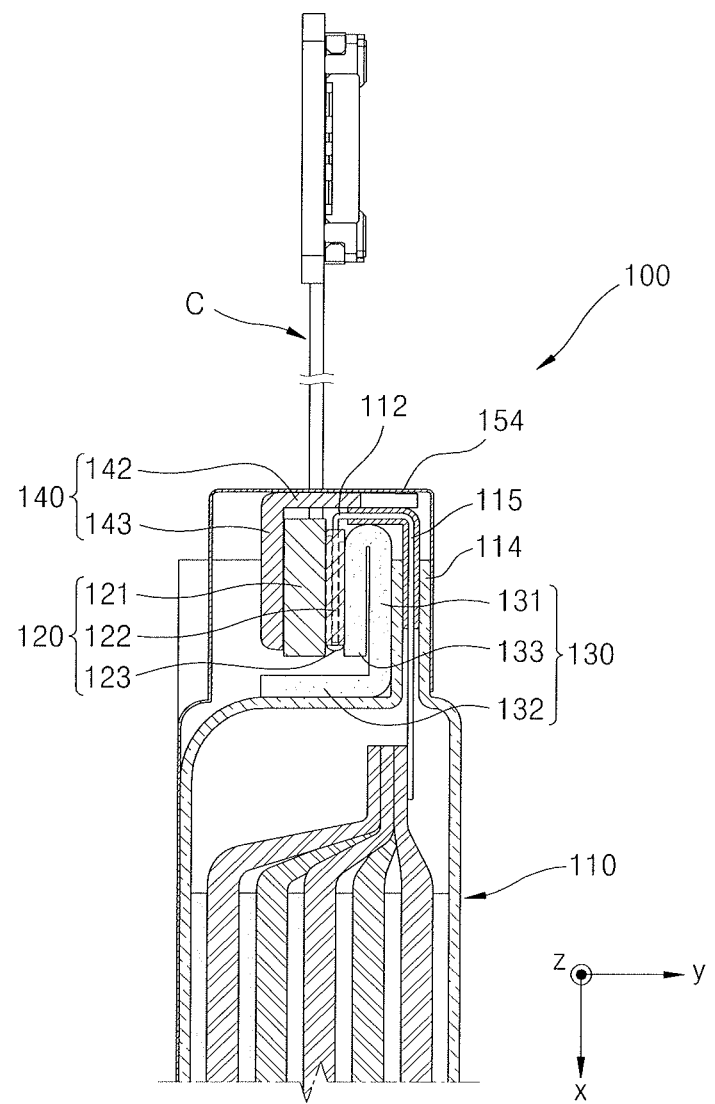
FIG. 14 is a cross-sectional view illustrating a portion of the battery pack shown in FIG. 13.

FIG. 13 is a perspective view illustrating a manufacturing sequence of the battery pack shown in FIG. 1. FIG. 14 is a cross-sectional view illustrating a portion of the battery pack 100 shown in FIG. 13.

Referring to FIGS. 13 and 14, the holder 140 may be arranged after the arrangement of the circuit module 120 is completed. At this time, the end portion of the circuit board 121 may be inserted into the insertion portion (not shown). In this case, the circuit board 121 may be fixed to the insertion portion.

When the holder 140 is arranged as described above, the first shield portion 142 and the second shield portion 143 may shield two surfaces of the circuit board 121, respectively. In this case, the second shield portion 143 may be arranged in parallel to the upper surface of the terrace portion 114 as described above, and the first shield portion 142 may be arranged to face an end of the terrace portion 114.

As described above, the lead-out hole (not shown) may be formed in the holder 140 such that a portion of the flexible circuit board unit C may be inserted through the lead-out hole. In this case, the flexible circuit board unit C may be drawn to the outside through the lead-out hole in a state in which the flexible circuit board unit C is bent. In this case, the lead-out hole may be shaped like a slot such that a portion of the flexible circuit board unit C may be inserted thereinto.

After the holder 140 is arranged as described above, the fourth protective member 154 may be attached to surround outer surfaces of the holder 140. At this time, the fourth protective member 154 may completely shield the holder 140, and a hole may be formed in the fourth protective member 154 to allow the flexible circuit board unit C to pass therethrough.

Therefore, in the battery pack 100, the thickness of the insulator 130 may be increased between the circuit module 120 and the terrace portion 114 to guarantee insulation between the circuit module 120 and the terrace portion 114.

Furthermore, in the battery pack 100, the insulator 130 having a large thickness is arranged between the circuit module 120 and the terrace portion 114, and thus, some of impact force applied to the terrace portion 114 may be absorbed by the insulator 130.

In the battery pack 100, the circuit module 120 may be securely supported owing to the holder 140, and insulation may be improved because two surfaces of the terrace portion 114 and the circuit module 120 are surrounded.

While preferred embodiments of the present disclosure have been described, various changes or modifications may be made therein without departing from the scope and spirit of the present disclosure. Accordingly, the appended claims cover all such changes and modifications falling within the spirit and scope of the present disclosure.

INDUSTRIAL APPLICABILITY

Embodiments of the present disclosure provide a safe battery pack and may be applied to electric vehicles, hybrid vehicles, ships, portable electronic devices, etc.

The invention claimed is:

1. A battery pack comprising:
a bare cell;
a circuit module arranged in parallel to a terrace portion of the bare cell and connected to a tab of the bare cell;
an insulator between the circuit module and the terrace portion, the insulator including:
a first insulation portion arranged in parallel to the terrace portion,
a second insulation portion connected to the first insulation portion at an angle from the first insulation portion, and
a third insulation portion connected to the first insulation portion, the third insulation portion being folded from the first insulation portion to overlap and be parallel to the first insulation portion, both the first and third insulation portions being between the circuit module and the terrace portion; and
a holder surrounding two surfaces of the circuit module and the terrace portion of the bare cell.

2. The battery pack of claim 1, wherein a surface of the circuit module on which a circuit device is mounted is in contact with the insulator.

3. The battery pack of claim 1, wherein the tab of the bare cell is bent at least once.

4. The battery pack of claim 1, wherein the holder includes:
an insertion portion into which the circuit module is inserted;
a first shield portion connected to the insertion portion and arranged along a front surface of the terrace portion; and
a second shield portion connected to the first shield portion at an angle from the first shield portion and arranged in parallel to the terrace portion.

5. The battery pack of claim 4, wherein the circuit module includes an insertion protrusion inserted into the insertion portion.

6. The battery pack of claim 4, wherein the insertion portion surrounds five surfaces of the circuit module.

7. The battery pack of claim 1, wherein at least one of the tab and a lead tab of the circuit module is folded and arranged between the circuit module and the terrace portion.

8. The battery pack of claim 1, wherein the third insulation portion is directly on and overlaps a majority of the first insulation portion.

9. The battery pack of claim 1, wherein the first through third insulation portions are integral and continuous with each other.

10. The battery pack of claim 1, wherein a combined thickness of the first and third insulation portions is larger than a thickness of the second insulation portion.

11. The battery pack of claim 1, wherein the first insulation portion has a same thickness as the third insulation portion.

12. The battery pack of claim 11, wherein the holder includes:
a first shield portion on a first surface of the circuit module and overlapping the terrace portion; and
a second shield portion connected perpendicularly to the first shield portion, the second shield portion overlapping a second surface of the circuit module and at least a portion of the third insulation portion.

* * * * *